United States Patent
Takahashi

(10) Patent No.: US 8,252,468 B2
(45) Date of Patent: Aug. 28, 2012

(54) NON-AQUEOUS ELECTROLYTE SECONDARY CELL WITH IMPROVED SAFETY

(75) Inventor: Kentaro Takahashi, Moriguchi (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 13/179,773

(22) Filed: Jul. 11, 2011

(65) Prior Publication Data

US 2011/0269028 A1  Nov. 3, 2011

Related U.S. Application Data

(62) Division of application No. 12/342,667, filed on Dec. 23, 2008.

(30) Foreign Application Priority Data

Dec. 28, 2007  (JP) .................. 2007-340514

(51) Int. Cl.
*H01M 6/16* (2006.01)

(52) U.S. Cl. ............ 429/343; 429/330; 429/338

(58) Field of Classification Search ......... 429/122–347
See application file for complete search history.

(56) References Cited

U.S. PATENT DOCUMENTS

| | | | |
|---|---|---|---|
| 2003/0190529 A1* | 10/2003 | Kim et al. ............... | 429/307 |
| 2004/0058251 A1 | 3/2004 | Hamamoto et al. | |
| 2004/0121239 A1 | 6/2004 | Abe et al. | |
| 2004/0137332 A1 | 7/2004 | Noh et al. | |
| 2004/0214092 A1 | 10/2004 | Noh et al. | |
| 2006/0166102 A1 | 7/2006 | Fujiwara et al. | |
| 2006/0177742 A1 | 8/2006 | Abe et al. | |
| 2007/0148554 A1 | 6/2007 | Abe | |

FOREIGN PATENT DOCUMENTS

| | | |
|---|---|---|
| CN | 1481593 A | 3/2004 |
| CN | 1938894 A | 3/2007 |
| CN | 1320688 C | 6/2007 |
| JP | 10-112335 A | 4/1998 |
| JP | 2002-298909 A | 10/2002 |
| JP | 2003-59529 A | 2/2003 |
| JP | 2004-214189 A | 7/2004 |
| JP | 2004-327444 A | 11/2004 |
| JP | 2006-32301 A | 2/2006 |
| WO | 02/15319 A1 | 1/2002 |
| WO | 02/059999 A1 | 8/2002 |

OTHER PUBLICATIONS

Machine Translation of JP 2006-032301 to Atsumichi originally published Feb. 2006.
Chinese Office Action dated Mar. 30, 2012, issued in corresponding Chinese Patent Application No. 200810190203.6, (3 pages).

\* cited by examiner

*Primary Examiner* — Basia Ridley
*Assistant Examiner* — Jonathan G Leong
(74) *Attorney, Agent, or Firm* — Westerman, Hattori, Daniels & Adrian, LLP

(57) ABSTRACT

A non-aqueous electrolyte secondary cell is provided having enhanced safety against overcharge and reduced self-discharge. The non-aqueous electrolyte secondary cell includes: a positive electrode having a positive electrode active material; a negative electrode having a negative electrode active material; and a non-aqueous electrolyte containing a non-aqueous solvent and electrolytic salt. The non-aqueous solvent contains 20 to 80 volume % tertiary carboxylic acid ester represented by Formula 2 at 25° C. and 1 atm. The non-aqueous electrolyte contains a halogenated benzene compound.

Formula 2

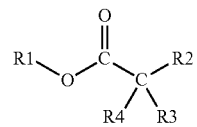

where R1 to R4 each denote a straight-chained or branched alkyl group having 4 or less carbon atoms and may be the same or different.

1 Claim, No Drawings

NON-AQUEOUS ELECTROLYTE SECONDARY CELL WITH IMPROVED SAFETY

INCORPORATED-BY-REFERENCE TO RELATED APPLICATIONS

This application is a continuation application of U.S. Ser. No. 12/342,667, filed Dec. 23, 2008, and is based on and claims priority from Japanese Patent Application No. 2007-340514, filed on Dec. 28, 2007, the entire contents of which being incorporated herein by reference.

BACKGROUND OF THE INVENTION

1) Field of the Invention

The present invention relates to a technique to improve the safety of non-aqueous electrolyte secondary cells at the time of overcharge.

2) Description of the Related Art

Non-aqueous electrolyte secondary cells, for their high energy density and high capacity, are widely used for the driving power sources of mobile appliances.

Incidentally, non-aqueous electrolytes used in the non-aqueous electrolyte secondary cells contain flammable organic solvents; when the cells should be overcharged, smoking or firing may result. This has created a need for a technique to improve the safety of non-aqueous electrolyte secondary cells at the time of overcharge.

Patent documents 1 to 7 disclose techniques related to non-aqueous electrolyte secondary cells.
Patent Document 1: WO02/015319.
Patent Document 2: WO02/059999.
Patent Document 3: Japanese Patent Application Publication No. 2002-298909.
Patent Document 4: Japanese Patent Application Publication No. 2003-59529.
Patent Document 5: Japanese Patent Application Publication No. 2004-214189.
Patent Document 6: Japanese Patent Application Publication No. 2004-327444.
Patent Document 7: Japanese Patent Application Publication No. 10-112335.

However, these techniques cannot enhance the safety of the non-aqueous electrolyte secondary cells at the time of overcharge without compromising cell properties such as the cycle characteristic and preservation characteristic.

SUMMARY OF THE INVENTION

In view of the foregoing and other problems, it is an object of the present invention to provide a technique to enhance the safety of the non-aqueous electrolyte secondary cells at the time of overcharge without compromising cell properties such as the cycle characteristic and preservation characteristic.

In order to accomplish the above and other objects, the present invention is configured as follows.

A non-aqueous electrolyte secondary cell includes: a positive electrode having a positive electrode active material; a negative electrode having a negative electrode active material; and a non-aqueous electrolyte containing a non-aqueous solvent and electrolytic salt. The non-aqueous solvent contains 20 to 80 volume % tertiary carboxylic acid ester represented by formula 1 at 25° C. and 1 atm. The non-aqueous electrolyte contains an alkylbenzene compound and/or a halogenated benzene compound.

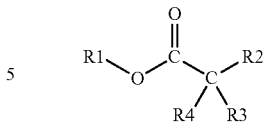

Formula 1 where R1 to R4 each denote a straight-chained or branched alkyl group having 4 or less carbon atoms and may be the same or different.

In order to enhance the safety of the cell at the time of overcharge (in order to prevent smoking and the like at the time of overcharge at high rate), it is necessary to contain tertiary carboxylic acid ester represented by Formula 1 in the non-aqueous solvent at 20 volume %. However, containing the tertiary carboxylic acid ester in the non-aqueous solvent at 20 volume % or more poses the problem of facilitated occurrence of self-discharge when the cell is left to stand. This decreases the cell voltage and increases the negative electrode potential. The high potential negative electrode and the non-aqueous electrolyte react with one another to decompose the non-aqueous electrolyte, thereby degrading cell properties such as the cycle characteristic.

In the above configuration, in the non-aqueous electrolyte containing the tertiary carboxylic acid ester, an alkylbenzene compound and/or a halogenated benzene compound are added. The alkylbenzene compound and the halogenated benzene compound serve to inhibit self-discharge of the non-aqueous electrolyte secondary cells containing tertiary carboxylic acid ester. Thus, in the above configuration, the negative electrode potential is prevented from increasing and the non-aqueous electrolyte is not decomposed, thereby preventing the degradation of the cell properties. Thus, a non-aqueous electrolyte secondary cell securing both safety at the time of overcharge and good cell characteristics is realized.

It should be noted that if the tertiary carboxylic acid ester is contained at more than 80 volume %, self-discharge cannot be prevented sufficiently even if the alkylbenzene compound and the halogenated benzene compound are contained. In view of this, the upper limit of the content of the tertiary carboxylic acid ester is 80 volume %.

The halogenated benzene compound may have one hydrogen atom of the benzene substituted with a halogen, or two or more hydrogen atoms substituted with halogens. When two or more hydrogen atoms are substituted with halogens, the two or more halogens may be the same or different. It is also possible that the rest of the hydrogen atoms of the halogenated benzene compound, which are not substituted with halogen, be substituted with an alkyl group, a halogenated alkyl group, an alkoxy group, or the like.

The alkylbenzene compound may have one hydrogen atom of the benzene substituted with an alkyl group, or two or more hydrogen atoms of the benzene substituted with alkyl groups. When two or more hydrogen atoms are substituted with alkyl groups, the two or more alkyl groups may be the same or different. The alkyl substituent groups may have their hydrogen atoms substituted with halogen. The alkyl substituent groups also may be straight-chained, branched, or cyclic. It is also possible that the rest of the hydrogen atoms of the alkylbenzene compound, which are not substituted with alkyl groups, be substituted with an alkoxy group or the like.

In the above configuration, the tertiary carboxylic acid ester may be methyl trimethylacetate and/or ethyl trimethylacetate.

The methyl trimethylacetate (compound with methyl groups for all R1 to R4 in Formula 1) and the ethyl trimethylacetate (compound with an ethyl group for R1 and methyl groups for R2 to R4 in Formula 1) are preferably used in that they provide a large effect per unit mass.

In the above configuration, the alkylbenzene compound may be at least one compound selected from the group consisting of cyclohexyl benzene, tert-amyl benzene, and tert-butyl benzene.

Cyclohexyl benzene, tert-amyl benzene, and tert-butyl benzene provide a high self-discharge preventing effect, and therefore at least one of them is preferably used.

In the above configuration, the content of the alkylbenzene compound may be 0.3 to 5.0 mass parts out of 100 mass parts of a total mass of the non-aqueous solvent and the electrolytic salt.

If the content of the alkylbenzene compound is less than 0.3 mass parts, a sufficient advantageous effect may not be obtained from the alkylbenzene compound, while if the content is more than 5.0 mass parts, the alkylbenzene compound may decrease the discharge capacity. In view of this, the content of the alkylbenzene compound is preferably within the claimed range.

In the above configuration, the halogenated benzene compound may be at least one compound selected from the group consisting of monofluoro benzene, monochloro benzene, 3-fluoroanisole, and 3,5-difluoroanisole.

Monofluoro benzene, monochloro benzene, 3-fluoroanisole, and 3,5-difluoroanisole provide a high self-discharge preventing effect and cause no harm to the discharge capacity, and therefore at least one of them is preferably used.

In the above configuration, the content of the halogenated benzene compound may be 0.2 to 4.5 mass parts out of 100 mass parts of a total mass of the non-aqueous solvent and the electrolytic salt.

If the content of the halogenated benzene compound is less than 0.2 mass parts, a sufficient advantageous effect may not be obtained from the halogenated benzene compound, while if the content is more than 4.5 mass parts, the halogenated benzene compound may decrease the discharge capacity. In view of this, the content of the halogenated benzene compound is preferably within the claimed range.

It should be noted that although the non-aqueous electrolyte may contain known additives such as vinylene carbonate, vinyl ethylene carbonate, and vinyl acetate, they are treated as additives and will not be included in the total mass of the non-aqueous solvent and the electrolytic salt.

DESCRIPTION OF THE PREFERRED EMBODIMENTS

Preferred embodiments of the present invention will be described below. It will be appreciated that the present invention will not be limited to the examples below, and that any practice of the invention with suitable amendments is possible without departing from the scope of the invention.

Embodiments

Preparation of the Positive Electrode

Ninety-five mass parts of lithium cobalt composite oxide serving as a positive electrode active material, 2 mass parts of acetylene serving as a conducting agent, 3 mass parts of polyvinylidene fluoride (PVdF) serving as a binding agent, and N-methyl-2-pyrrolidone (NMP) are mixed together, thus preparing a positive electrode active material slurry. This positive electrode active material slurry is applied to both surfaces of a positive electrode current collector (12 μm thick) made of aluminum by doctor blading, followed by drying to remove the solvent (NMP), which is necessary for preparation of the slurry. Then, the dried electrode plate is rolled to a thickness of 120 μm and cut to a predetermined size, thus completing a positive electrode.

Preparation of the Negative Electrode

Ninety-five mass parts of a negative electrode active material made of artificial graphite (d(002) value: 0.336 nm) with its surface non-crystallized, 5 mass parts of polyvinylidene fluoride (PVdF) serving as a binding agent, and N-methyl-2-pyrrolidone are mixed together, thus preparing a negative electrode active material slurry. This negative electrode active material slurry is applied to both surfaces of a negative electrode current collector (8 μm thick) made of copper, followed by drying to remove the solvent (NMP), which is necessary for preparation of the slurry. Then, the dried electrode plate is rolled to a thickness of 130 μm and cut to a predetermined size, thus completing a negative electrode.

Preparation of the Electrode Assembly

The positive and negative electrodes were wound with a separator (16 μm thick) made of finely porous film of polyolefin, and then pressed, thus preparing a flatly wound electrode assembly.

Preparation of the Non-aqueous Electrolyte

Methyl trimethylacetate (MTMA) represented by Formula 2 and ethylene carbonate (EC) are mixed in a volume ratio of 80:20 at 25° C. and 1 atm to form a non-aqueous solvent. Next, $LiPF_6$ serving as an electrolyte salt is dissolved at a rate of 1.0 M (mol/litter) in this mixture so as to prepare a non-aqueous electrolytic solution. To 100 mass parts of the non-aqueous electrolytic solution, a benzene compound is added, thus preparing a non-aqueous electrolyte.

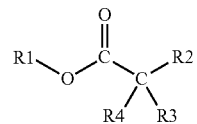

Formula 2 where R1 to R4 are all methyl groups.

Assembly of the Cell

A commercial aluminum laminate is prepared. This aluminum laminate material is folded to form a bottom portion and a cup-form electrode assembly storage space. Then, this flatly wound electrode assembly is inserted into the storage space.

After the flatly wound electrode assembly is inserted into the storage space, the outer casing is depressurized to impregnate a separator with the non-aqueous electrolyte. Then the opening portion of the outer casing is sealed, thus preparing a non-aqueous electrolyte secondary cell.

Examples 1 to 45, Comparative Examples 1 to 25

Cells according to examples 1 to 45 and comparative examples 1 to 25 were prepared in the same manner as in the above embodiment except that the kind of the non-aqueous solvent, the volume mixture ratio of the non-aqueous solvent, the kind of the benzene compound, and the content of the benzene compound were varied as shown in Tables 1 to 6.

[Measurement of the Initial Capacity]

Cells were prepared in the same manner as in examples 1 to 45 and comparative examples 1 to 25. These cells were charged at a constant current of 0.5 It (390 mA) to a voltage of 4.2 V and then at a constant voltage of 4.2 V for 5 hours in total. Then, the cells were discharged at a constant current of 0.5 It (390 mA) to a voltage of 2.75 V. The discharge capacity of each cell was measured and assumed an initial capacity. The charge and discharge were carried out under a condition of 23° C. The results are shown in Tables 1 to 6.

[Self-Discharge Property Test]

Cells were prepared in the same manner as in examples 1 to 45 and comparative examples 1 to 25. These cells were charged under the same conditions as in the measurement of the initial capacity, and then discharged. The discharged cells were left to stand at 23° C. for 90 days, and the voltage of each cell was measured before and after each cell was left to stand. The difference (ΔV) of cell voltage before and after each cell was left to stand is shown in Tables 1 to 6.

[Measurement of the 60° C. Cycle Characteristics]

Cells were prepared in the same manner as in examples 4 and 31 to 45 and comparative examples 24 and 25. These cells were subjected to 500 cycles of charge and discharge under the following conditions.

i) The cells were charged at a constant current of 1.0 It (780 mA) to a voltage of 4.2 V and then at a constant voltage of 4.2 V for 3 hours in total.

ii) The cells were discharged at a constant current of 1.0 It (780 mA) to a voltage of 2.75 V.

iii) Return to i).

The cycle characteristic of each cell was calculated from the following formula. The charge-discharge cycles were carried out under a condition of 60° C. The results are shown in Table 6.

60° C. cycle characteristic(%)=500th cycle discharge capacity/1st cycle discharge capacity×100

[Overcharge Safety Test]

Cells were prepared in the same manner as in examples 4, 11 to 14, and 18 to 30 and comparative examples 20 and 23.

i) These cells were charged at a constant current of 0.6 It (468 mA) to a voltage of 12.0 V and then at a constant voltage of 12.0 V for 15 hours in total. The cases where smoking occurred during this overcharge were not further tested, and the current value at this time was assumed a current limit value.

ii) For the cases where no smoking occurred, respective new cells were prepared under the same conditions. The new cells were subjected to the same test as i) except that the constant current during the charge was raised to 0.1 It (78 mA).

iii) The cases where no smoking occurred were subjected to a test with a constant current value raised in the ii) manner during the charge until smoking was observed.

A maximum current rate of each cell at which no smoking was observed was estimated as a current limit value, and the results are shown in Tables 4 and 5. The test was carried out at 23° C.

TABLE 1

| | Non-aqueous solvent | | Benzene compound | | Initial capacity (mAh) | Voltage drop amount (ΔV) |
|---|---|---|---|---|---|---|
| | Kind | Volume ratio | Kind | Mass % | | |
| Comparative Example 1 | EC/MTMA | 30/70 | — | — | 784 | 0.65 |
| Example 1 | EC/MTMA | 30/70 | Monofluoro benzene | 0.2 | 785 | 0.16 |
| Example 2 | EC/MTMA | 30/70 | Monofluoro benzene | 0.5 | 785 | 0.08 |
| Example 3 | EC/MTMA | 30/70 | Monofluoro benzene | 1.0 | 782 | 0.07 |
| Example 4 | EC/MTMA | 30/70 | Monofluoro benzene | 2.0 | 784 | 0.08 |
| Example 5 | EC/MTMA | 30/70 | Monofluoro benzene | 4.0 | 787 | 0.06 |
| Example 6 | EC/MTMA | 30/70 | Monofluoro benzene | 4.5 | 780 | 0.05 |
| Example 7 | EC/MTMA | 30/70 | Monofluoro benzene | 5.0 | 769 | 0.05 |
| Comparative Example 2 | EC/DEC | 30/70 | — | — | 785 | 0.07 |
| Comparative Example 3 | EC/DEC | 30/70 | Monofluoro benzene | 2.0 | 780 | 0.09 |

TABLE 2

| | Non-aqueous solvent | | Benzene compound | | Initial capacity (mAh) | Voltage drop amount (ΔV) |
|---|---|---|---|---|---|---|
| | Kind | Volume ratio | Kind | Mass % | | |
| Comparative Example 1 | EC/MTMA | 30/70 | — | — | 784 | 0.65 |
| Example 8 | EC/MTMA | 30/70 | tert-amyl benzene | 0.3 | 788 | 0.21 |

TABLE 2-continued

| | Non-aqueous solvent | | Benzene compound | | Initial capacity (mAh) | Voltage drop amount (ΔV) |
|---|---|---|---|---|---|---|
| | Kind | Volume ratio | Kind | Mass % | | |
| Example 9 | EC/MTMA | 30/70 | tert-amyl benzene | 0.5 | 784 | 0.12 |
| Example 10 | EC/MTMA | 30/70 | tert-amyl benzene | 1.0 | 786 | 0.05 |
| Example 11 | EC/MTMA | 30/70 | tert-amyl benzene | 2.0 | 781 | 0.06 |
| Example 12 | EC/PC/MTMA | 30/5/65 | tert-amyl benzene | 2.0 | 788 | 0.05 |
| Example 13 | EC/PC/MTMA | 30/10/60 | tert-amyl benzene | 2.0 | 783 | 0.05 |
| Example 14 | EC/PC/MTMA | 30/20/50 | tert-amyl benzene | 2.0 | 785 | 0.05 |
| Example 15 | EC/MTMA | 30/70 | tert-amyl benzene | 4.0 | 782 | 0.05 |
| Example 16 | EC/MTMA | 30/70 | tert-amyl benzene | 5.0 | 779 | 0.05 |
| Example 17 | EC/MTMA | 30/70 | tert-amyl benzene | 5.5 | 762 | 0.05 |
| Comparative Example 2 | EC/DEC | 30/70 | — | — | 785 | 0.07 |
| Comparative Example 4 | EC/DEC | 30/70 | tert-amyl benzene | 1.0 | 782 | 0.08 |
| Comparative Example 5 | EC/DEC | 30/70 | tert-amyl benzene | 2.0 | 789 | 0.07 |
| Comparative Example 6 | EC/PC/DEC | 30/5/65 | tert-amyl benzene | 2.0 | 784 | 0.06 |
| Comparative Example 7 | EC/PC/DEC | 30/10/60 | tert-amyl benzene | 2.0 | 781 | 0.06 |
| Comparative Example 8 | EC/PC/DEC | 30/20/50 | tert-amyl benzene | 2.0 | 782 | 0.06 |

TABLE 3

| | Non-aqueous solvent | | Benzene compound | | Initial capacity (mAh) | Voltage drop amount (ΔV) |
|---|---|---|---|---|---|---|
| | Kind | Volume ratio | Kind | Mass % | | |
| Comparative Example 9 | EC/DEC/MTMA | 30/60/10 | — | — | 784 | 0.11 |
| Comparative Example 10 | EC/DEC/MTMA | 30/50/20 | — | — | 783 | 0.47 |
| Comparative Example 11 | EC/DEC/MTMA | 30/40/30 | — | — | 783 | 0.54 |
| Comparative Example 12 | EC/DEC/MTMA | 30/50/20 | — | — | 785 | 0.61 |
| Comparative Example 13 | EC/EMC/MTMA | 30/20/50 | — | — | 788 | 0.60 |
| Comparative Example 14 | EC/PC/MTMA | 30/5/65 | — | — | 786 | 0.66 |
| Comparative Example 15 | EC/PC/MTMA | 30/10/60 | — | — | 783 | 0.57 |
| Comparative Example 16 | EC/PC/MTMA | 30/20/50 | — | — | 781 | 0.55 |
| Comparative Example 1 | EC/MTMA | 30/70 | — | — | 784 | 0.65 |
| Comparative Example 17 | EC/ETMA | 30/70 | — | — | 781 | 0.61 |
| Comparative Example 18 | EC/MTMA | 20/80 | — | — | 782 | 0.96 |
| Comparative Example 19 | EC/MTMA | 10/90 | — | — | 774 | 1.37 |

TABLE 4

| | Non-aqueous solvent | | Benzene compound | | Initial capacity (mAh) | Voltage drop amount (ΔV) | Current limit value (It) |
|---|---|---|---|---|---|---|---|
| | Kind | Volume ratio | Kind | Mass % | | | |
| Comparative Example 20 | EC/DEC/MTMA | 30/60/10 | Monofluoro benzene | 2.0 | 785 | 0.08 | 0.7 |
| Example 18 | EC/DEC/MTMA | 30/50/20 | Monofluoro benzene | 2.0 | 783 | 0.06 | 1.3 |
| Example 19 | EC/DEC/MTMA | 30/40/30 | Monofluoro benzene | 2.0 | 781 | 0.07 | 1.5 |
| Example 20 | EC/DEC/MTMA | 30/20/50 | Monofluoro benzene | 2.0 | 782 | 0.07 | 1.6 |
| Example 21 | EC/EMC/MTMA | 30/20/50 | Monofluoro benzene | 2.0 | 784 | 0.10 | 1.6 |
| Example 22 | EC/PC/MTMA | 30/20/50 | Monofluoro benzene | 2.0 | 780 | 0.11 | 2.1 |
| Example 4 | EC/MTMA | 30/70 | Monofluoro benzene | 2.0 | 784 | 0.08 | 2.3 |
| Example 23 | EC/ETMA | 30/70 | Monofluoro benzene | 2.0 | 781 | 0.11 | 2.2 |
| Example 24 | EC/MTMA | 20/80 | Monofluoro benzene | 2.0 | 780 | 0.18 | 2.3 |
| Comparative Example 21 | EC/MTMA | 10/90 | Monofluoro benzene | 2.0 | 770 | 1.09 | 2.3 |

TABLE 5

| | Non-aqueous solvent | | Benzene compound | | Initial capacity (mAh) | Voltage drop amount (ΔV) | Current limit value (It) |
|---|---|---|---|---|---|---|---|
| | Kind | Volume ratio | Kind | Mass % | | | |
| Comparative Example 22 | EC/DEC/MTMA | 30/60/10 | tert-amyl benzene | 2.0 | 784 | 0.10 | 0.7 |
| Example 25 | EC/DEC/MTMA | 30/50/20 | tert-amyl benzene | 2.0 | 783 | 0.07 | 1.3 |
| Example 26 | EC/DEC/MTMA | 30/40/30 | tert-amyl benzene | 2.0 | 783 | 0.06 | 1.5 |
| Example 27 | EC/DEC/MTMA | 30/20/50 | tert-amyl benzene | 2.0 | 789 | 0.06 | 1.7 |
| Example 28 | EC/EMC/MTMA | 30/20/50 | tert-amyl benzene | 2.0 | 786 | 0.07 | 1.7 |
| Example 11 | EC/MTMA | 30/70 | tert-amyl benzene | 2.0 | 781 | 0.06 | 2.3 |
| Example 12 | EC/PC/MTMA | 30/5/65 | tert-amyl benzene | 2.0 | 788 | 0.05 | 2.3 |
| Example 13 | EC/PC/MTMA | 30/10/60 | tert-amyl benzene | 2.0 | 783 | 0.05 | 2.1 |
| Example 14 | EC/PC/MTMA | 30/20/50 | tert-amyl benzene | 2.0 | 785 | 0.05 | 2.1 |
| Example 29 | EC/MTMA | 30/70 | tert-amyl benzene | 2.0 | 781 | 0.08 | 2.2 |
| Example 30 | EC/MTMA | 30/80 | tert-amyl benzene | 2.0 | 782 | 0.05 | 2.3 |
| Comparative Example 23 | EC/MTMA | 10/90 | tert-amyl benzene | 2.0 | 784 | 1.42 | 2.3 |

TABLE 6

| | Non-aqueous solvent | | Benzene compound | | Initial capacity (mAh) | Voltage drop amount (ΔV) | 60° C. cycle characteristic (%) |
|---|---|---|---|---|---|---|---|
| | Kind | Volume ratio | Kind | Mass % | | | |
| Comparative Example 24 | EC/MTMA | 30/70 | Benzene | 2.0 | 787 | 0.71 | 33 |
| Comparative Example 25 | EC/MTMA | 30/70 | Anisole | 2.0 | 784 | 0.92 | 51 |

TABLE 6-continued

|  | Non-aqueous solvent | | Benzene compound | | Initial capacity (mAh) | Voltage drop amount (ΔV) | 60° C. cycle characteristic (%) |
|---|---|---|---|---|---|---|---|
|  | Kind | Volume ratio | Kind | Mass % |  |  |  |
| Example 4 | EC/MTMA | 30/70 | Monofluoro benzene | 2.0 | 784 | 0.08 | 83 |
| Example 31 | EC/MTMA | 30/70 | 1,3-difluoro benzene | 2.0 | 787 | 0.11 | 72 |
| Example 32 | EC/MTMA | 30/70 | 1,3,5-trifluoro benzene | 2.0 | 782 | 0.09 | 75 |
| Example 33 | EC/MTMA | 30/70 | Monochloro benzene | 2.0 | 783 | 0.13 | 82 |
| Example 34 | EC/MTMA | 30/70 | Monofluoro biphenyl | 2.0 | 780 | 0.07 | 72 |
| Example 35 | EC/MTMA | 30/70 | Fluorocyclohexyl benzene | 2.0 | 782 | 0.05 | 77 |
| Example 36 | EC/MTMA | 30/70 | 2-fluoroanisole | 3.0 | 786 | 0.07 | 74 |
| Example 37 | EC/MTMA | 30/70 | 3-fluoroanisole | 3.0 | 781 | 0.07 | 86 |
| Example 38 | EC/MTMA | 30/70 | 2,4-difluoroanisole | 3.0 | 784 | 0.04 | 73 |
| Example 39 | EC/MTMA | 30/70 | 3,5-difluoroanisole | 2.0 | 783 | 0.04 | 84 |
| Example 40 | EC/PC/MTMA | 30/20/50 | 3,5-difluoroanisole | 2.0 | 782 | 0.04 | 84 |
| Example 11 | EC/MTMA | 30/70 | tert-amyl benzene | 2.0 | 781 | 0.06 | 65 |
| Example 41 | EC/MTMA | 30/70 | tert-butyl benzene | 2.0 | 785 | 0.08 | 67 |
| Example 42 | EC/MTMA | 30/70 | Cyclohexyl benzene | 2.0 | 785 | 0.07 | 68 |
| Example 43 | EC/MTMA | 30/70 | Toluene | 2.0 | 780 | 0.12 | 66 |
| Example 44 | EC/MTMA | 30/70 | Ethylbenzene | 2.0 | 783 | 0.11 | 63 |
| Example 45 | EC/MTMA | 30/70 | n-butylbenzene | 2.0 | 788 | 0.13 | 65 |

In Tables 1 to 6, the meanings of the abbreviations in the section of "non-aqueous solvent" are as follows:
EC: ethylene carbonate
PC: propylene carbonate
DEC: diethyl carbonate
EMC: ethylmethyl carbonate
MTMA: methyl trimethylacetate
ETMA: ethyl trimethylacetate Table 3 shows that in comparative examples 1, 2, and 9 to 19, which contain no benzene compounds such as alkylbenzene compounds and halogenated benzene compounds, comparative examples 1 and 10 to 19, which contain 20 volume % or more tertiary carboxylic acid ester (methyl trimethylacetate (MTMA) and ethyl trimethylacetate (ETMA)), have voltage drops of 0.47 to 1.37 V, which are significantly larger than a 0.11 V voltage drop for comparative example 9, which has a methyl trimethylacetate (MTMA) content of 10 volume %, and a 0.07 V voltage drop for comparative example 2, which contains no (0 volume %) methyl trimethylacetate (MTMA).

A possible explanation for this is as follows. In the case of containing 20 volume % or more tertiary carboxylic acid ester, self-discharge easily occurs, though a reason therefor is yet to be revealed. Thus, the cell voltage greatly decreases (i.e., the voltage drop increases).

Table 1 shows that examples 1 to 7, which contain 70 volume % methyl trimethylacetate (MTMA) and have a monofluoro benzene content of 0.2 mass % or more, have voltage drops of 0.05 to 0.16 V, which are superior to a 0.65 V voltage drop for comparative example 1, which contains 70 volume % methyl trimethylacetate (MTMA) and contains no monofluoro benzene.

A possible explanation for this is that the halogenated benzene compounds such as monofluoro benzene provide the effect of preventing the cell containing methyl trimethylacetate (MTMA) from self-discharging, thereby lessening the voltage drop.

Table 1 also shows that example 7, which contains 70 volume % methyl trimethylacetate (MTMA) and has a monofluoro benzene content of 5.0 mass %, has an initial capacity of 769 mAh, which is smaller than 780 to 787 mAh initial capacities for examples 1 to 6, which contain 70 volume % methyl trimethylacetate (MTMA) and have a monofluoro benzene content of 0.2 to 4.5 mass %.

A possible explanation for this is as follows. Containing a large amount of halogenated benzene compound such as monofluoro benzene decreases the lithium ion conductivity of the non-aqueous electrolyte, resulting in a decrease in discharge capacity. In view of this, the content of the halogenated benzene compound such as monofluoro benzene is preferably 0.2 to 4.5 mass %.

Table 2 shows that examples 8 to 17, which contain 50 to 70 volume % methyl trimethylacetate (MTMA) and have a tert-amyl benzene content of 0.3 mass % or more, have voltage drops of 0.05 to 0.21 V, which are superior to a 0.65 V voltage drop for comparative example 1, which contains 70 volume % methyl trimethylacetate (MTMA) and contains no tert-amyl benzene.

A possible explanation for this is as follows. The alkylbenzene compounds such as tert-amyl benzene provide the effect of preventing the cell containing methyl trimethylacetate (MTMA) from self-discharging, thereby lessening the voltage drop.

Table 2 also shows that example 17, which contains 70 volume % methyl trimethylacetate (MTMA) and has a tert-amyl benzene content of 5.5 mass %, has an initial capacity of 762 mAh, which is smaller than 779 to 788 mAh initial capacities for examples 8 to 16, which contain 50 to 70 volume % methyl trimethylacetate (MTMA) and have a tert-amyl benzene content of 0.3 to 5.0 mass %.

A possible explanation for this is as follows. Containing a large amount of alkylbenzene compound such as tert-amyl benzene decreases the lithium ion conductivity of the non-aqueous electrolyte, resulting in a decrease in discharge capacity. In view of this, the content of the alkylbenzene compound is preferably 0.3 to 5.0 mass %.

Tables 4 and 5 show that comparative examples 20 and 22, which have a methyl trimethylacetate (MTMA) content of 10 volume % or less, have a current limit of 0.7 It, which is inferior to 1.3 to 2.3 It current limits for examples 4 and 11 to 14, which have a methyl trimethylacetate (MTMA) content of 20 volume % or more.

A possible explanation for this is that if the content of the tertiary carboxylic acid ester is less than 20 volume %, the security of the cell at the time of overcharge cannot be sufficiently improved.

Tables 4 and 5 also show that comparative examples 21 and 23, which contain monofluoro benzene or tert-amyl benzene and have a methyl trimethylacetate (MTMA) content of 90 volume %, have voltage drops of 1.09 V and 1.42 V, which are inferior to 0.05 to 0.18 V voltage drops for examples 4, 11 to 14, and 18 to 30, which contain monofluoro benzene or tert-amyl benzene and have a methyl trimethylacetate content of 20 to 80 volume %.

A possible explanation for this is as follows. If a large amount of tertiary carboxylic acid ester such as methyl trimethylacetate is contained, self-discharge cannot be sufficiently prevented even with the addition of the halogenated benzene compound and the alkylbenzene compound, resulting in a drop in voltage. In view of this, the upper limit of the tertiary carboxylic acid ester is preferably 80 volume %.

Table 6 shows that a sufficient advantageous effect can be obtained using any of the various halogenated benzene compounds and alkylbenzene compounds, and that no advantageous effects can be obtained from benzene compounds without halogen and alkyl groups, such as anisole (comparative example 24) and benzene (comparative example 25).

Table 6 also shows that the cases of using monofluoro benzene, monochloro benzene, 3-fluoroanisole, and 3,5-difluoroanisole (examples 4, 33, 37, 39, and 40) have 60° C. cycle characteristics of 82 to 86%, which are superior to 72 to 77% 60° C. cycle characteristics for the cases of using other halogenated benzene compounds (examples 31, 32, 34, 36, and 38). In view of this, when a halogenated benzene compound is used, at least one compound selected from the group consisting of monofluoro benzene, monochloro benzene, 3-fluoroanisole, and 3,5-difluoroanisole is preferably used.

Also, these results show that a similar advantageous effect can be obtained from the case where a hydrogen atom of the benzene is substituted with an alkoxy group (i.e., halogenated anisole is used).

Table 6 also shows that the cases of using cyclohexyl benzene, tert-amyl benzene, and tert-butyl benzene (examples 11, 41, and 42) have voltage drops of 0.06 to 0.08 V, which are superior to 0.11 to 0.13 V voltage drops for the cases of using other alkylbenzene compounds (examples 43 to 45). In view of this, when an alkylbenzene compound is used, at least one compound selected from the group consisting of cyclohexyl benzene, tert-amyl benzene, and tert-butyl benzene is preferably used.

INDUSTRIAL APPLICABILITY

As has been described hereinbefore, the present invention realizes a non-aqueous electrolyte secondary cell that is highly safe at the time of overcharge and has minimized self-discharge. Therefore, the industrial applicability of the present invention is considerable.

What is claimed is:

1. A non-aqueous electrolyte secondary cell comprising:
a positive electrode having a positive electrode active material;
a negative electrode having a negative electrode active material; and
a non-aqueous electrolyte containing a non-aqueous solvent and electrolytic salt, wherein:
the non-aqueous solvent contains 20 to 80 volume % tertiary carboxylic acid ester at 25° C. and 1 atm;
the non-aqueous electrolyte contains at least one halogenated benzene compound selected from the group consisting of 3-fluoroanisole and 3,5-difluoroanisole;
the non-aqueous solvent further contains ethylene carbonate;
the tertiary carboxylic acid ester is methyl trimethylacetate and/or ethyl trimethylacetate; and
the content of the halogenated benzene compound is 0.2 to 4.5 mass parts out of 100 mass parts of a total mass of the non-aqueous solvent and the electrolytic salt.

\* \* \* \* \*